United States Patent [19]
Dey

[11] 3,930,885
[45] Jan. 6, 1976

[54] ORGANIC ELECTROLYTE RESERVE CELL

[75] Inventor: Arabinda N. Dey, Needham, Mass.

[73] Assignee: P. R. Mallory & Co., Inc., Indianapolis, Ind.

[22] Filed: Jan. 11, 1973

[21] Appl. No.: 322,677

[52] U.S. Cl................................ 136/114; 136/113
[51] Int. Cl.²........................................ H01M 21/10
[58] Field of Search ....................... 136/112–114, 136/162, 90

[56] References Cited
UNITED STATES PATENTS

| | | | |
|---|---|---|---|
| 2,624,767 | 1/1953 | Moulton | 136/113 |
| 2,783,291 | 2/1957 | Gold | 136/90 |
| 2,852,592 | 9/1958 | Salauze | 136/113 X |
| 3,294,589 | 12/1966 | Barrett | 136/114 X |
| 3,376,166 | 4/1968 | Hruden | 136/114 X |
| 3,468,715 | 9/1969 | Riedl | 136/113 X |
| 3,484,297 | 12/1969 | Zaleski | 136/114 |
| 3,736,188 | 5/1973 | Kaye | 136/90 |
| 3,743,545 | 7/1973 | Merz et al. | 136/114 |

*Primary Examiner*—Anthony Skapars
*Attorney, Agent, or Firm*—Charles W. Hoffmann, Esq.; Robert F. Meyer; Ronald S. Cornell

[57] ABSTRACT

A reserve cell is described for providing electrochemical energy and which is capable of long shelf life in the reserve state. This cell comprises a combined prismatic electrode chamber overlayed with a compartment containing the electrolyte. The electrolyte is prevented from access to the electrode chamber, by a frangible sealing means. The reserve cell is designed to be rapidly actuated by a separable actuator means of which the reserve cell actuator means described in U.S. Pat. No. 3,484,297 is preferred. The electrolyte compartment is completely lined with an electrolyte impermeable lining forming the electrolyte container which is collapsible. Upon actuation the applied pressure forcibly expels the electrolyte from the electrolyte container into the electrode chamber. This cell is particularly adapted for use with high energy electromotive couples including those dependent on active anodic metals above hydrogen in the electrochemical series and particularly such metals as lithium, calcium, sodium and potassium.

3 Claims, 2 Drawing Figures

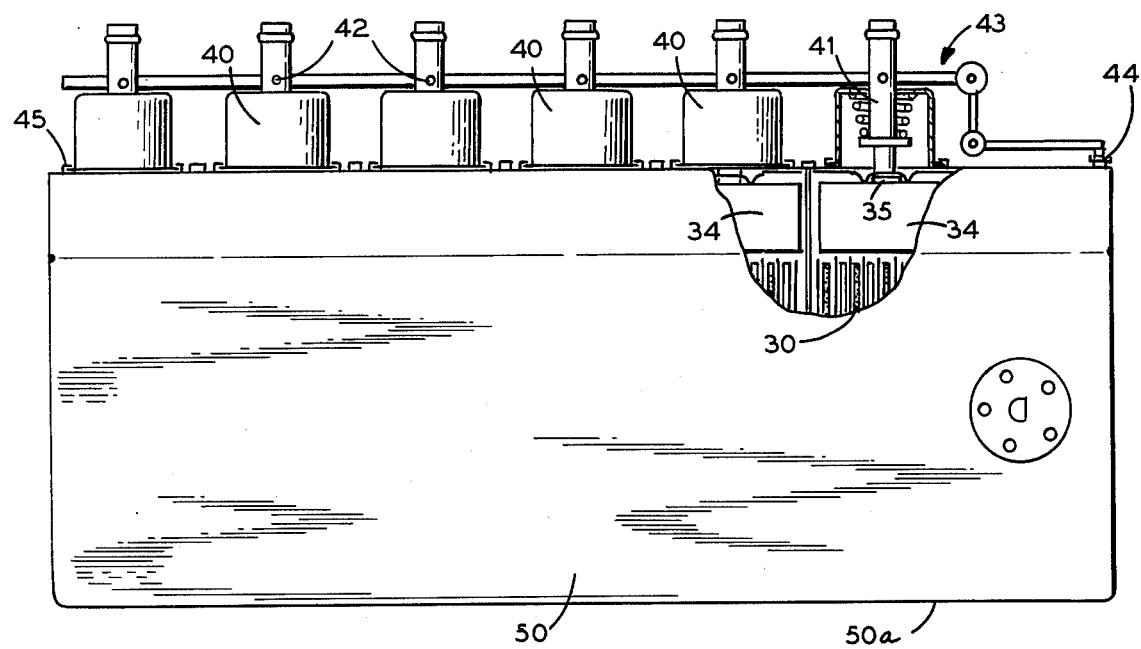

ORGANIC ELECTROLYTE RESERVE CELL

FIELD OF THE INVENTION

This invention relates to reserve electrochemical energy sources and more particularly to reserve cells capable of retaining electrochemical energy in a reserve state until actuation, said electrochemical energy being derived from high voltage electrochemical couples, including active metal anodes.

BACKGROUND OF THE INVENTION

In order to increase the useful longevity of cells and batteries both for military and civilian use, it is desired that such electrochemical energy sources be kept at a ready condition until the energy is required. In this manner the operating cycle of the device is only initiated at the time the operation of the device is required. Such devices have been described as "reserve" cells in that the energy output is withheld or reserved until required. Moreover in such devices it is required that the operation of the device be positive and foolproof. Further, recently it has become desirable to provide cells and batteries with high voltage electrochemical couples. The advantages therein lie in that the voltage from each cell couple is in the order of 2 volts to 3.5 volts. Such high energy electrochemical couples are based primarily on the use of highly active anodic metals. These active metals are those which lie above hydrogen in the electrochemical series i.e., they are capable of displacing hydrogen from water. Because of this capability of displacing hydrogen from water, water-based electrolytes cannot be safely used therewith. When water is used in conjunction with high energy electrochemical couples and particularly such couples involving anodic materials such as lithium, sodium, potassium and calcium, contact of the electrolyte with the anodic material will liberate copious amounts of hydrogen and oxygen which upon accumulation within the cell chamber may form explosive mixtures. For this reason it is preferred to use organic electrolytes in conjunction with such materials. Consequently the electrolyte should be based upon organic solvents.

Many of the organic electrolyte cells consist of: (a) active, high-voltage, light metal anodes such as lithium, (b) a wide variety of depolarizers including metal halides, oxides, perioxides, chromates, permanganates, periodates, molybdates, vanadates, arsenates, phosphates, sulfates, etc. and (c) a wide variety of electrolytes consisting of organic solvents such as tetrahydrofuran, propylene carbonate, gamma-butyrolactone, dimethylsulfite, N-nitrosodimethylamine, methylformate, dimethylcarbonate, N:N dimethylformamide, butylformate, acetonitrile, dimethoxyethane, dimethylsulfoxide etc. with a wide variety of dissolved active metal salts such as perchlorates, tetrachloroaluminates, tetrafluoroborates, chlorides, hexafluorophosphates, hexafluoroarsenates, etc. of the active metals. Such cells, when the electrodes are maintained immersed in the electrolytes even though the electrochemical circuit is not completed, show a degradation of performance on prolonged storage at elevated temperatures. This problem is due to spontaneous chemical reaction between the electrolyte and the extremely active anode and cathode materials. This problem is usually eliminated by using a reserve cell structure for these cells wherein the electrolyte is stored in a separate compartment away from the active electrodes and when needed the cell is activated by releasing the electrolyte into the electrode chamber by suitable means.

THE INVENTION

I have invented a reserve cell structure suitable for use with organic electrolyte cells and using for activation a commercially available activating device such as the device described in U.S. Pat. No. 3,484,297 (Zaleski).

The object of this invention is to provide a novel reserve structure for the organic electrolyte cells which has the advantages of high voltage; high energy density; high volumetric and gravimetric efficiency; long shelf life; low cost; durability; easy, reliable, disposable activation means; quick activation; multiplate cellular structure; and unitary battery construction which is capable of quick activation. These advantages and further objects of the present invention will become apparent from the following description.

DETAILED DESCRIPTION OF THE INVENTION

Figure 1:
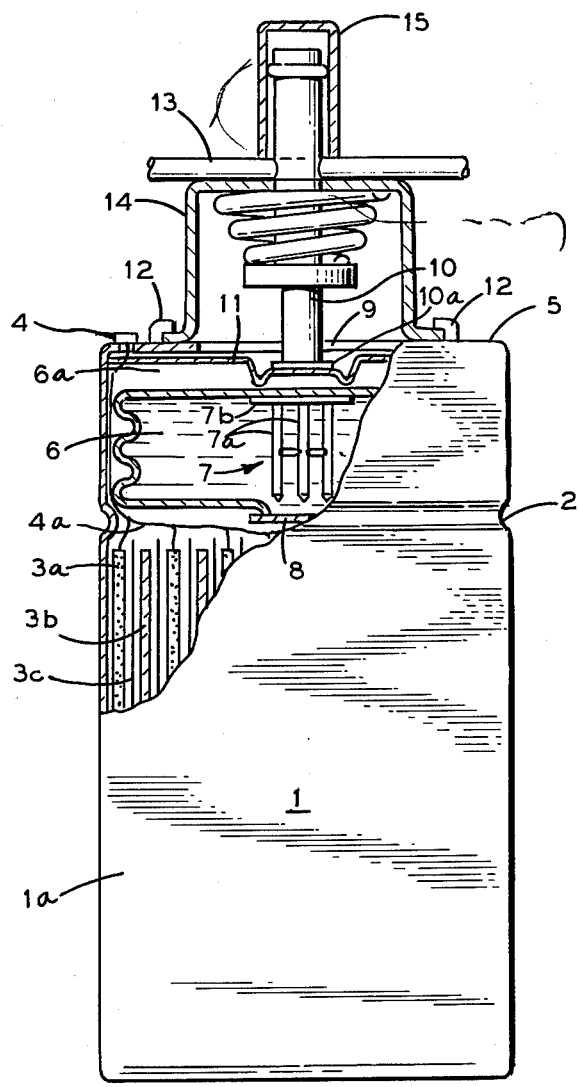

FIG. 1 is a schematic diagram of the reserve cell structure according to this invention with parts cut away to show the internal construction thereof and FIG. 2 shows a multi-cell reserve battery construction with parts cut away to show the arrangement of the cells to form a battery and showing the safety devices to prevent accidental activation or actuation of the reserve battery.

In the schematic drawing of the reserve structure in FIG. 1, the interior of the cell is shown in partial section. The prismatic cell 1 includes casing 1a which is preferably made of a nickel-plated steel or of molded polymers, such as polyolefins or phenolics, or other rigid materials capable of resisting atmospheric and chemical corrosion. Groove 2 placed just above electrode stack 3 is incorporated into the cell casing 1a in order to provide a demarkation of the electrolyte compartment 6a and to provide a support for a prismatic electrolyte containing capsule or reservoir 6. The electrode stack 3 includes a parallel plate stack of rectangular anodes 3a and cathodes 3b. Between the electrodes is positioned bibulous separator material 3c inert to the electrolyte and the electrodes. The cathode terminals are connected to a common tab 4a which in turn is connected to a glass-metal seal terminal 4 attached to the cell top 5 to provide external terminals for the cell 1. The anode terminals are similarly connected to the casing 1a via a common tab (not shown).

The prismatic electrolyte capsule 6 in compartment 6a provided with a circular opening on one side is molded from flexible polymeric material, such as phenolics, diallyphthalates or high density polyolefins. On the side adjacent to the electrodes an opening is provided which is closed by a frangible thin walled sealing lid 8. An impact transmitting bar 7, consisting of three or more vertical impact bars 7a, with a flat circular disc 7b at the top is placed inside the electrolyte capsule 6 with the flat disc 7b placed opposite to the lid 8 of the capsule 6. The inner wall of the capsule 6 is sealed to this flat disc 7b. The capsule 6 is filled with electrolyte and a circular thin walled sealing lid 8 is placed over the circular opening of the capsule and sealed to the capsule. A layer of polyethylene may be used between the two pieces. The capsule 6 is then inverted so that the capsule lid end faces the electrode stack 3 and the entire capsule 6 is then positioned in the electrolyte compartment 6a to rest on groove 2 of the cell case 1 directly above the electrode stack 3. Cell top 5 consists of nickel-plated steel lid with a central orifice 9 for the contact positioning of the spring loaded plunger 10 of the standard activation mechanism according to U.S. Pat. No. 3,484,297 in contact with bellows 11. The glass-to-metal seal cathode terminal 4 is attached to cell top 5. The inner side of the nickel-plated steel cell top 5 is hermetically heat sealed to a flexible polyethylene aluminum foil laminate bellows 11 of capsule 6. Cell top 5 is sealed to the cell case 1a after incorporation of the electrode stack 3 and the positioning of the electrolyte capsule 6 in the cell case 1a.

Bellows 11 is free at the central part where it rests within the electrolyte compartment 6a and in contact with capsule 6 inside the cell casing 1a and the spring loaded plunger 10 outside of the cell. A metal protective disc may be protectively placed below the plunger head 10a and the bellows 11 in order to protect the capsule 6 from puncture when it is impacted by the spring loaded plunger 10 during activation. Cell top 5 is also fitted with a pair of clasps 12 for retaining the activation mechanism housing 14. These clasps permit the positioning of the separable activation mechanism 15 just prior to activation and the removal of the activating mechanism 15 after activation. The activation mechanism 15 is capable of interchangeable reuse for cells of this type.

The disposable activation mechanism 15 includes a spring loaded plunger 10 which is restrained by a pin 13. Twisting of the activation mechanism housing 14 causes pin 13 to slip through a hole (not shown) in the top of housing 14 thus releasing the spring and the plunger 10 which impacts the electrolyte capsule 6 through bellows 11 and the impact transmitting bar 7 which thereupon breaks the thin frangible lid 8 and compresses the electrolyte capsule 6 thus releasing and expelling the electrolyte into the electrode stack 3 and thus activating the cell 1. Pin 13 is prevented from slipping through the hole (not shown) in the housing 14 by safety pin 15 which has to be removed prior to cell activation by twisting off of the housing 14. The activation mechanism housing 14 along with the spring and the plunger 10 is automatically released from cell top clasp 12 after activation.

The electrode stacks 3 may be connected in series or parallel and by packaging them in a battery case 50a as shown by FIG. 2. The battery 50 shown in FIG. 2 consists of 6 cells 30.

The simultaneous activation of all the cells 30 of battery 50 of FIG. 2 is achieved by slight modifications of the activation mechanism 14 of FIG. 1. This is accomplished by removal of all of the restraining pins 42 of the spring-loaded plungers 41 of activators 40 of all the cells by means of ripcord 43 interconnected to all of the pins 42. The handle of the ripcord is secured at one end of the battery in safety catch 44. The activation mechanism housings 40 may be removed after use by pushing them from one side to dislodge them from cell top clasps 45.

The reserve cell structures of this invention are applicable to a variety of organic electrolyte batteries and generally to all hermetically sealed batteries.

Various modifications of the above reserve structures are easily derived by those skilled in the art from the specific preferred structures of the preferred embodiment hereinabove described. Such modifications which may be useful for certain specific applications include cylindrical construction rather than the prismatic construction set forth herein. Pre-molding of all the activation mechanism housing clasps 45 of all the cells 30 in a battery into a single plastic case 50a so that all the activation housings 40 can be removed in a single disengaging operation is a similar modification. The use of spring loading or lever actuation in the design of the ripcord mechanism 43 so that all of the retaining pins 42 and retaining activator plunger 41 may be released, by release of one single activating arm is also possible. Further, the invention includes providing a single spring loaded activation housing mechanism removal means, so that after activation the disengagement of a single member will remove the entire activation mechanism from the complete battery 50. These and other modifications of the basic design of my invention will be apparent to those skilled in the art and such modifications within the scope of this invention are intended to be included within the ambit of this invention.

What is claimed is:

1. An organic electrolyte reserve cell comprising, a cell casing having an open end, a spring loaded disposable plunger activation mechanism having a vertically movable plunger placed therein and adapted to be moved by the spring, said plunger mechanism connected to said cell casing by a plurality of ears formed in said open end of said casing; a metal resilient lid for closing said casing, said lid having a central depressed portion to which said plunger is in abutment and whereby said central depressed lid portion may be moved upon movement of said plunger at a predetermined time; a plastic containing electrolyte reservoir having an accordian like configuration contained in said casing, a circular disc in said reservoir having a severality of impact rigid bars connected to the underside of said electrolyte reservoir opposite the depressed center of said metal cell lid, a frangible flat disc connected to said electrolyte reservoir and being placed over the electrodes of said cell, whereby when said always rigid impact bars are driven down against said frangible disc quickly and positively breaks the same so as to allow the organic electrolyte to quickly flow and activate the cell electrodes and to energize the cell without trouble.

2. An organic electrolyte reserve cell comprising, a cell casing having an open end, a spring loaded disposable plunger activation mechanism having a vertically movable plunger contained therein and adapted to be moved by the spring, said plunger mechanism connected to said battery casing by a multiplicity of ears formed in said open end of said casing; a metal resilient lid for closing said casing, said lid having a central depressed portion to which said plunger is in abutment and whereby said central lid portion may be moved significantly upon movement of said plunger at a predetermined time; a plastic pleated electrolyte reservoir contained in said cell casing, a circular disc connected to said reservoir having a plurality of vertical rigid impact bars connected to the underside of said electrolyte reservoir at a point opposite the depressed center of said metal cell lid; a frangible flat disc connected to said electrolyte reservoir placed adjacent the electrodes of said cell, whereby when said stiff always rigid impact bars are driven against said frangible disc quickly and positively breaks the same so as to allow the organic electrolyte to repeatly flow and activate the cell electrodes and to energize the cell without incident.

3. An organic electrolyte reserve cell comprising, a cell casing having a top open end, a pressure spring loaded disposable plunger activation mechanism having a vertically movable rod plunger therein and adapted to be moved vertically upon said spring activation, said plunger mechanism being directly connected to said battery casing by a plurality of struck out ears formed at said open end of said casing; a metal lid for closing said open end of said casing, said lid having a central depressed resilient portion to which said plunger is in abutment and whereby said central lid having a central depressed resilient portion to which said plunger is in abutment and whereby said central lid portion may be moved downward significantly upon movement of said plunger; a molded pleated fluid electrolyte reservoir contained therein, a circular flat thin disc having a plurality of vertical impact rigid bars connected to the underside of said electrolyte reservoir at a point opposite the depressed center of said metal cell top open end, a frangible flat lid connected to said electrolyte reservoir being placed adjacent the electrodes of the electrochemical cell, whereby when said always rigid impact bars are driven against said frangible disc quickly and positively breaks the same so as to allow the organic electrolyte to flow and activate the cell electrodes and to energize the cell.

* * * * *

United States Patent [19]

Mesiti et al.

[11] 3,930,886

[45] Jan. 6, 1976

[54] POROUS FLUORO-CARBON POLYMER MATRICES

[75] Inventors: Edward C. Mesiti, Jenkintown, Pa.; Solomon Rosenblatt, Montclair, N.J.

[73] Assignee: Leesona Corporation, Warwick, R.I.

[22] Filed: June 18, 1973

[21] Appl. No.: 370,719

Related U.S. Application Data

[60] Continuation of Ser. No. 197,932, Nov. 11, 1971, abandoned, Division of Ser. No. 850,339, Aug. 12, 1969, Pat. No. 3,627,859, which is a continuation of Ser. No. 543,786, April 20, 1966, abandoned, which is a continuation-in-part of Ser. No. 491,864, Sept. 30, 1965, abandoned.

[52] U.S. Cl. .................. 136/146; 264/49; 264/127
[51] Int. Cl.² ......................................... H01M 2/14

[58] Field of Search .......... 136/146, 142, 143, 144, 136/145, 148; 264/49, 127

[56] References Cited
UNITED STATES PATENTS

| | | | |
|---|---|---|---|
| 3,418,168 | 12/1968 | Wentworth | 136/86 |
| 3,497,256 | 2/1970 | Rosenblatt | 264/44 |
| 3,702,267 | 11/1972 | Grot | 136/146 |
| 3,749,604 | 7/1973 | Langer et al. | 136/146 |

*Primary Examiner*—John H. Mack
*Assistant Examiner*—H. A. Feeley
*Attorney, Agent, or Firm*—A. W. Breiner

[57] ABSTRACT

An improved hydrophobic polymer matrix having preselected wettable characteristics.

5 Claims, No Drawings